Figure 1:
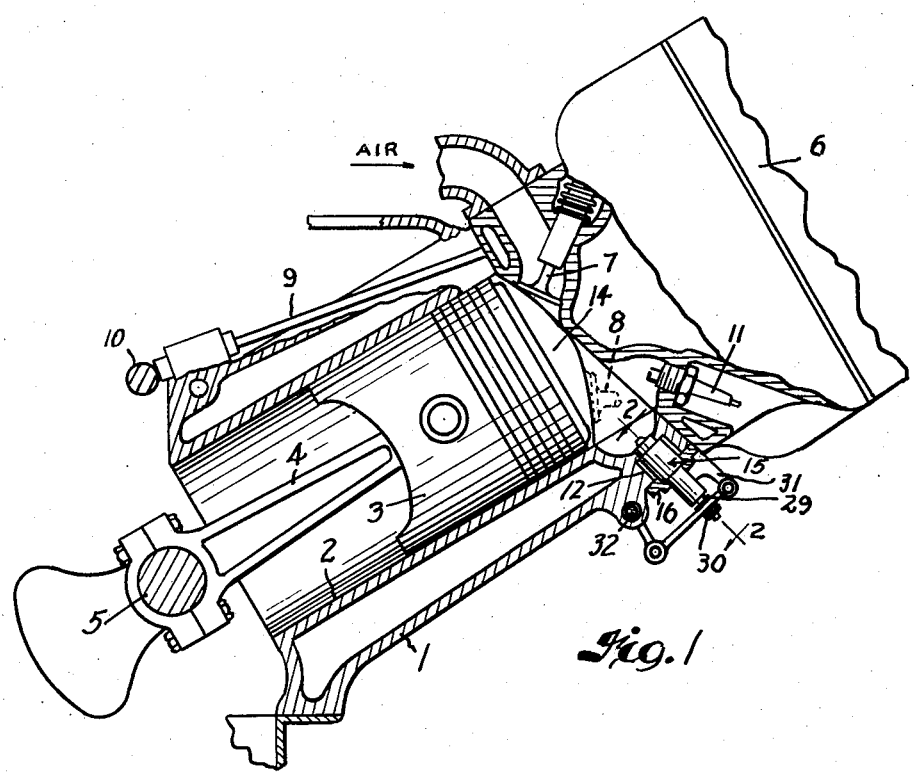

Nov. 4, 1958  J. A. BEDE  2,858,811
FUEL INJECTION

Filed Feb. 14, 1956  2 Sheets-Sheet 1

INVENTOR.
JAMES A. BEDE
BY
Oberlin + Limbach
ATTORNEYS.

INVENTOR.
JAMES A. BEDE

United States Patent Office 2,858,811
Patented Nov. 4, 1958

2,858,811

FUEL INJECTION

James A. Bede, Cleveland, Ohio

Application February 14, 1956, Serial No. 565,393

1 Claim. (Cl. 123—32)

The present invention relates generally as indicated to fuel injection, and more particularly to fuel injection in compression ignition and spark ignition internal combustion engines.

Much work has been done heretofore in the attempt to substitute fuel injection for carburetion in gasoline engines, as has been done in connection with diesel engines.

Among the requirements of the fuel injection system are the following;

(1) The injection of accurately metered quantities of fuel as demanded by the load on the engine and at the proper times;

(2) The injection of the fuel at the desired rate to control combustion and resulting pressure rise;

(3) The atomization of the fuel to the required degree;

(4) The distribution of the fuel throughout the combustion chamber; and (5) The beginning and ending of the injection sharply without "after dribble."

The present invention is concerned principally with the point (3) above, that is, the atomization of the fuel. It has been discovered that, with fuel injection in a convention spark ignition, the compression ratios may be increased and super-charging may be employed without regard for the octane number of the fuel; the ability to burn lean mixtures results in fuel economy under part load; the ability to control the load by the mixture strength (without resorting to air throttling) makes fuel injection attractive for use with two-stroke cycle engines; and the engine may utilize fuels of any octane number and a wide range of boiling points, it being possible to considerably relax fuel specifications with increased yield of injection fuel from crude petroleum.

Needless to say, the heart of any fuel injection engine is the injection system, which must supply metered amounts of fuel and, most important, atomize the fuel.

There are known two general types of injection systems, namely, the air injection system, wherein fuel is forced into the cylinder by means of compressed air to achieve mixing of the fuel with the air and the ability to utilize inexpensive, high viscosity fuels; and the solid injection system, wherein a high pressure pump injects fuel through a spray nozzle into the combustion chamber.

The solid injection system is further subdivided into (1) the common rail type, in which the pump supplies fuel under high pressure to a fuel header, and the high pressure in the header forces the fuel through each of the push rod-rocker arm-actuated nozzles located in the engine cylinders; (2) the unit injection type in which each cylinder is provided with a unit injector to which fuel is supplied by a low pressure pump and, at the proper time, a high pressure pump combined with the nozzle in one housing operates to inject the fuel; and (3) the individual pump and nozzle type wherein each cylinder is provided with a pump and an injector, the injector being located in the cylinder and the pump being located on the side of the engine.

As aforesaid, one of the most important of the enumerated requirements of an ideal fuel injection system is that the fuel be properly atomized, and it is to the achievement of this end that the present invention is primarily concerned.

Accordingly, it is a principal object of this invention to provide a fuel injection device and a method of fuel injection with which and by which complete atomization of the fuel is accomplished.

Broadly stated, the fuel injection device herein has associated therewith a heater which heats the fuel to a predetermined temperature such that the internal force of expansion of the fuel is employed as a positive factor in the subdivision of the sprayed, heated particles of fuel. Thus, this invention harnesses a fourth force, that is, the internal force of expansion which has been completely overlooked by others skilled in the art.

The three forces presently put to use in the atomization of liquid are turbulence, jet velocity, and air resistance, which forces to achieve atomization must overcome the negative forces of viscosity and surface tension of the liquid being atomized.

In my invention, the fuel particles after discharged through the spray nozzle, are further "blown apart" by sudden release of a strong internal force of expansion created by the heating of the fuel to exceed the boiling point of a lower flash point constituent thereof.

Insofar as the process is concerned, the present invention is concerned with the predetermined heating of a liquid hydrocarbon fuel which contains a greater than normal percentage of the higher flash point constituents, and the injecting of the heated fuel, under the influence of high pressure, through a nozzle into an engine combustion chamber, the high pressure on the heated fuel preventing vaporization of the lower flash point constituents whose atmospheric pressure boiling points have been exceeded by the heating step, whereupon the release of pressure on the heated fuel through the nozzle to a relatively lower value enables immediate vaporization of such lower flash point constituents so that the sprayed particles are "blown apart" by the internal force of expansion.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

Figure 2:
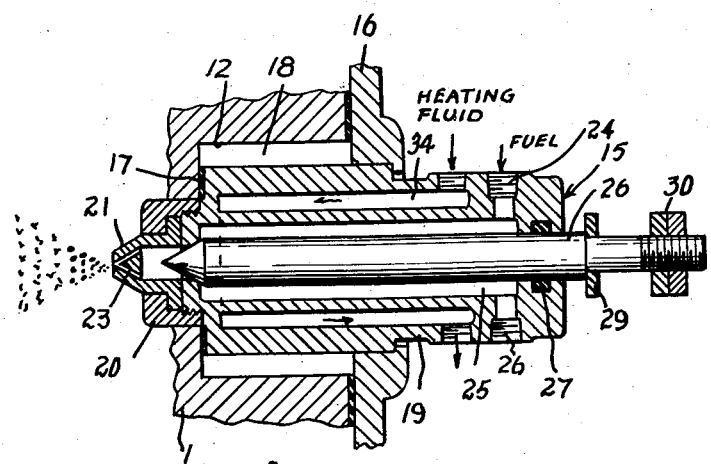
Figure 3:
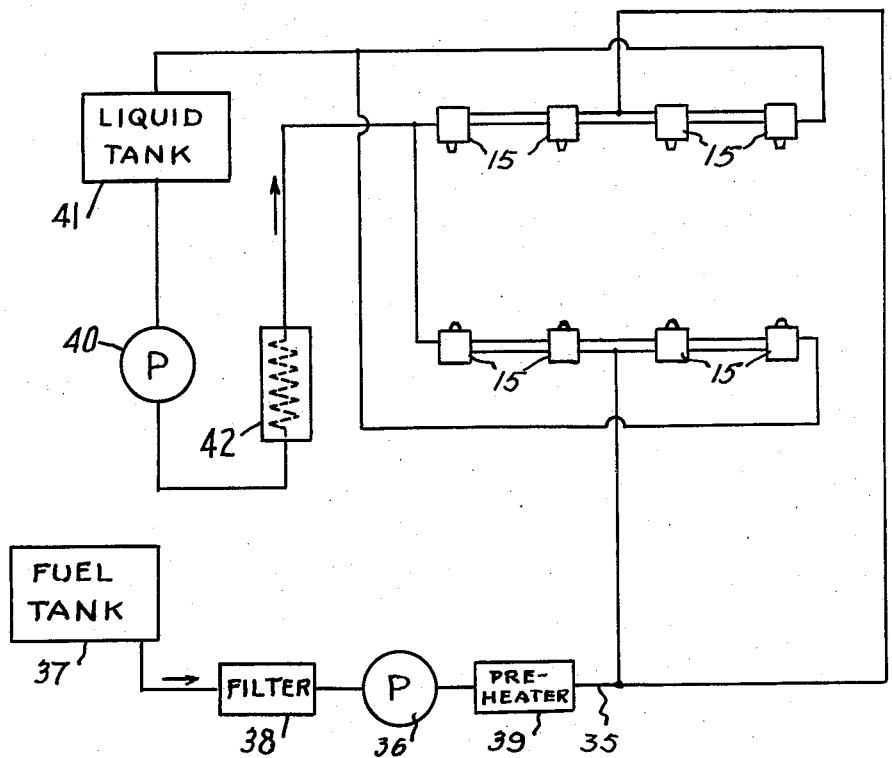

In said annexed drawing:

Fig. 1 is a cross-section view through the cylinder of an internal combustion engine having the present injection device installed therein;

Fig. 2 is a cross-section view taken substantially along the line 2—2, Fig. 1, showing my improved form of fuel injector and associated fuel heating means; and Fig. 3 is a schematic diagram showing one pump for supplying fuel under high pressure to the injection nozzles and showing another pump for circulating fluid heat exchange medium through the nozzles for predeterminedly heating the fuel prior to its injection into the respective combustion chambers of the engine.

Referring now more specifically to the drawing, and first to Fig. 1, there is shown therein a typical spark ignition internal combustion engine comprising an engine block 1 formed with water-jacketed cylinders 2 in each of which a piston 3 reciprocates to transmit power, in well known manner, through the piston rod 4 thereof to the crank shaft 5.

Secured to the block 1 is the cylinder head assembly 6 which, in this case, is shown as carrying the overhead inlet and exhaust valves 7 and 8, said valves being operated by push rods 9 and rocker arms (not shown) in well known manner, the push rods 9 being actuated as by the cam shaft 10 which is driven by the crank shaft 5.

In this particular example, the cylinder head 6 also is shown as carrying the spark plugs 11 associated with the respective cylinders 2.

The present invention is to be understood to be applicable to the in-line type of engine as well as to the V-type engine, of which one cylinder 2 of one bank has been shown herein. Furthermore, the present invention is equally well applicable to compression ignition engines in which the spark plugs 11 are not required.

As shown in Figs. 1 and 2, the side of the engine block 1 is provided with a recess 12 for each cylinder 2 which recess leads into the combustion chamber 14 of the engine and in which recess is mounted the injection device 15 which constitutes the present invention. The injection device is clamped to the engine block 1 as by means of the plate 16 bolted thereto; and, if desired, a single plate 16 may be employed to clamp all of the injectors 15 in each bank of engine cylinders in place.

As best shown in Fig. 2, there is preferably employed a gasket 17 between the injector 15 and the bottom of the recess 12 to form a fluid-tight joint; and, in addition, the recess 12 is preferably of larger diameter than the injector 15 to provide an air space 18 which renders the engine block temperature less effective to influence the heating of the fuel in the injector 15.

The injector 15 comprises a generally cylindrical chambered body 19, to one end of which is secured, as by means of the nut 20, a spray nozzle 21 preferably provided with a plurality of converging spray orifices 23. Ports 24 lead into the fuel chamber 25 and a needle or equivalent type of valve 26 is movable in said body to close and to open the nozzle 21, a suitable packing ring 27 being employed to prevent leakage.

The injector 15 is opened and closed at the proper times as by means of the rocker arm 28 which engages the adjustable collars 29 and 30 on the needle valve stem, said rocker arm 28 having one end pivotally connected on an ear 31 of the clamp plate 16 and the other end thereof being swung to open and to close the needle valve 26 through a cam or crank shaft 32 which is linked to such other end of the rocker arm 28.

Surrounding the fuel chamber 25 of the injector 15 is a chamber 34 through which heated liquid such as hot oil, for example, is adapted to be circulated for the purpose of heating the fuel in the injector 15 to a predetermined temperature before the fuel is sprayed into the combustion chamber 14.

In Fig. 3 is shown a schematic piping diagram showing one way of supplying fuel to eight separate injectors 15 and of circulating heating liquid through said injectors 15 for the purpose of predeterminedly heating the fuel prior to injection.

As shown, the injectors 15 are connected in parallel to a fuel header 35, and a pump 36 is effective to displace fuel from the fuel tank 37 through a filter 38 and through a fuel preheater 39 at the desired high pressure so that fuel at that pressure is available at each injector 15 at the time that the same is opened.

Insofar as the final heating of the fuel to the desired temperature is concerned, the heating fluid is pumped successively through the chambers 34 of the injectors 15 by means of the circulating pump 40 which draws heating liquid, such as oil, from the tank 41 and pumps the same through the heat exchanger 42, the latter preferably being electrically heated and located as close as practicable to the injectors 15 to minimize heat loss in the conduits leading from the delivery port of the heater to the series of banks of injectors 15. The heater 42 will preferably be thermostatically controlled in well known manner so as to control the temperature of the heating liquid and thus of the fuel in the injector fuel chambers 25.

By way of specific example, a conventional winter gasoline may have the following composition of petroleum fractions:

5% of 110° F. flash point
   20% of 160° F. flash point
   70% of 180° F. flash point
    5% of 220° F. flash point With the present improvements, efficient engine operation is achieved by changing the gasoline composition as follows: 30% of 140° F. flash point and 70% of 220° F. flash point, which is much less expensive than the conventional fuel, and in addition has the desired long-burning characteristics and need not have nearly as high an octane rating even in a high compression engine.

Referring to Fig. 3, this new fuel blend will be delivered by the pump 36 to the injectors 15 at a desired pressure, the normally used pressure being in the vicinity of 500–600 p. s. i. The preheater 39 in this case is effective to heat the fuel passing therethrough to a temperature of, say, 120° F.

The other heater 42 is arranged to heat the fuel in each of the injectors 15 so that, at the time of spraying, the temperature of the fuel is at approximately 200° F., which is greater than the atmospheric pressure boiling point of the lower flash point constituent of the fuel, but vaporization of such constituent is prevented by the applied pressure on the fuel in the injectors 15. Now, when the fuel is injected into the combustion chamber 14, the release of the pressure thereon to a much lower pressure permits such low flash point constituent to immediately vaporize and thus "blow apart" the sprayed particles of fuel in the combustion chamber.

It has been noted that, by increasing the injection pressure over and above the 500 or 600 p. s. i. in the above example, better fuel dispersion is achieved, as well as greater penetration of the fuel into all locations of the combustion chamber. Increased injection pressure also produces finer droplets of fuel which more easily mix with the air.

Another factor is that the greater the density of the compressed air in the combustion chamber, the greater the resistance offered to the travel of the fuel droplets across the chamber with resultant better dispersion of the fuel.

Each nozzle member 21 sprays the fuel into the chamber 14 in such a manner as to minimize the quantity of fuel that impinges on the surrounding walls, thereby minimizing decomposition and the resulting carbon deposits, unpleasant odor, smoky exhaust, and increased fuel consumption.

As is well known in the art, the design of the injector 15 must be closely interrelated to the type of combustion chamber 14 used; and, therefore, no detailed discussion of injector design is made herein except to note that the nozzles 21 may be of the single-orifice type, the multiple-orifice type, or the so-called "pintle-nozzle" type, each having certain advantages with certain types of non-turbulent or turbulent combustion chambers. In any case, the nozzle 21 must not only be able to atomize and distribute the fuel in the combustion chamber 14, but must produce the necessary mixing of the fuel and the air in the combustion chamber.

Best atomization, with its resultant advantages, are obtained herein by discharging the fuel in predeterminedly heated condition into the combustion chamber 14 so as to harness the added force of internal expansion of the fuel which heretofore has been overlooked by prior inventors in the field of fuel injection for internal combustion engines.

In Fig. 2 is illustrated, in much magnified size, the nature of the atomization achieved herein, the fuel droplets initially issuing from the nozzle 21 being mostly of about 5 micron size and then being further "blown apart" to much smaller particle size due to the aforesaid force of internal expansion created by the heating of the fuel and spray discharging the heated fuel under pressure through the nozzle 21.

For substantially complete vaporization of a gasoline having a boiling point of approximately 130° F. at atmospheric pressure and having the following composition:

|  | A. S. T. M. boiling range |
| --- | --- |
| Negligible | 85°– 95° F. |
| 10% | 115°–132° F. |
| 50% | 211°–230° F. |
| 40% | 335°–365° F. |
| Negligible | 400°–430° F. | it is preferred to spray the gasoline into the combustion chamber under the influence of a pressure of at least 400 p. s. i. and at a temperature of at least about 200° F. above the atmospheric pressure boiling point, that is, about 330° F. Under such conditions of operation, substantially all of the gasoline immediately vaporizes when the pressure is released into the combustion chamber, but yet some gasoline droplets remain to effect spreading out of the ignition period.

The percentage of gasoline which thus expands to gaseous state can, of course, be controlled by the temperature thereof at the time of spraying, and by the same token, the injection pressure may be less if the degree of heating of the gasoline is less.

Other modes of applying the principle of the invention may be employed, change being made as regards the details described, provided the features stated in the following claim, or the equivalent of such, be employed.

I therefore particularly point out and distinctly claim as my invention:

The method of forming the fuel charge of an internal combustion engine, which comprises subjecting a vaporizable fuel made up of components of different flash point viz, a major portion of a component having a flash point of at least about 220° F. and a minor portion of another component having a flash point not greater than about 140° F. to a temperature at which such lower flash point component is vaporized under normal pressure, confining such heated fuel under a pressure of several hundred pounds per square inch which is sufficient to maintain such lower flash point component in liquid state, and then discharging a measured amount of such heated fuel into the combustion chamber of such engine under the influence of the imposed pressure, whereby such lower flash point component is effective, due to sudden expansion thereof upon discharge of the heated fuel, to break up the higher flash point component into droplet form of which some remains unvaporized to effect spreading out of the ignition period.

References Cited in the file of this patent

UNITED STATES PATENTS

| | | |
| --- | --- | --- |
| 873,840 | Clift | Dec. 17, 1907 |
| 1,160,480 | Wheeler | Nov. 16, 1915 |
| 1,464,253 | Wales | Aug. 7, 1923 |
| 1,511,820 | Rochefort | Oct. 14, 1924 |
| 1,709,744 | Schnurle | Apr. 16, 1929 |
| 2,747,555 | Brunner | May 29, 1956 |